United States Patent
Mukherjee et al.

(10) Patent No.: US 10,234,504 B1
(45) Date of Patent: Mar. 19, 2019

(54) OPTIMIZING CORE WRAPPERS IN AN INTEGRATED CIRCUIT

(71) Applicant: Cadence Design Systems, Inc., San Jose, CA (US)

(72) Inventors: Subhasish Mukherjee, Noida (IN); Jagjot Kaur, Milpitas, CA (US); Vivek Chickermane, Slaterville Springs, NY (US); Susan Marie Genova, Upton, MA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 64 days.

(21) Appl. No.: 15/452,526

(22) Filed: Mar. 7, 2017

(51) Int. Cl.
*G01R 31/28* (2006.01)
*G01R 31/317* (2006.01)
*G01R 31/3177* (2006.01)

(52) U.S. Cl.
CPC ... *G01R 31/31723* (2013.01); *G01R 31/3177* (2013.01); *G01R 31/31704* (2013.01)

(58) Field of Classification Search
CPC ........ G01R 31/31723; G01R 31/31704; G01R 31/3177; G01R 31/318555; G01R 31/318594; G01R 31/318547; G01R 31/318536; G06F 17/5045; G06F 17/5072; G06F 2217/84; G06F 2217/14
See application file for complete search history.

(56) References Cited

U.S. PATENT DOCUMENTS

| | | |
|---|---|---|
| 8,296,694 B1 | 10/2012 | Chakravadhanula et al. |
| 8,468,404 B1 | 6/2013 | Chickermane et al. |
| 8,584,074 B1 | 11/2013 | Thirunavukarasu et al. |
| 8,732,632 B1 | 5/2014 | Keller et al. |
| 2002/0184582 A1* | 12/2002 | Pouya ............ G01R 31/318385 714/726 |
| 2007/0094629 A1* | 4/2007 | Alter ................... G06F 17/5045 716/122 |
| 2009/0206866 A1* | 8/2009 | Shomrony ..... G01R 31/318555 324/762.02 |
| 2010/0318843 A1* | 12/2010 | Singh ................. G11C 29/4401 714/6.12 |
| 2016/0349320 A1* | 12/2016 | Laisne ............... G01R 31/3177 |

OTHER PUBLICATIONS

Qiang Xu et al., "On Reducing Wrapper Boundary Register Cells in Modular SOC Testing", 1 ITC Proc. 622 (2003), DOI: 10.1109/TEST.2003.1270889, 10 pages.
Sandeep Kaushik et al., "Complex SoC Testing with a Core-Based DFT Strategy", EE Times (Feb. 26, 2008, 3:00 PM EST), 8 pages, http://www.eetimes.com/document.asp?doc_id=1276127.
Teresa L. McLaurin, "Delay Wrapper Register Requiring Only One Register and One Scan Enable", (Jun. 16, 2005, 3:05 PM), 6 pages, http://infocenter.arm.com/help/index.jsp?topic=/com.arm.doc.arp0034a/index.html.

* cited by examiner

*Primary Examiner* — Guerrier Merant
(74) *Attorney, Agent, or Firm* — Foley & Lardner LLP

(57) ABSTRACT

According to certain aspects, the present embodiments relate to optimizing core wrappers in an integrated circuit to facilitate core-based testing of the integrated circuit. In some embodiments, an integrated circuit design flow is adjusted so as to increase the use of shared wrapper cells in inserted core wrappers, and to reduce the use of dedicated wrapper cells in such core wrappers, thereby improving timing and other integrated circuit design features. In these and other embodiments, the increased use of shared wrapper cells is performed even in the presence of shift registers in the integrated circuit design.

16 Claims, 9 Drawing Sheets

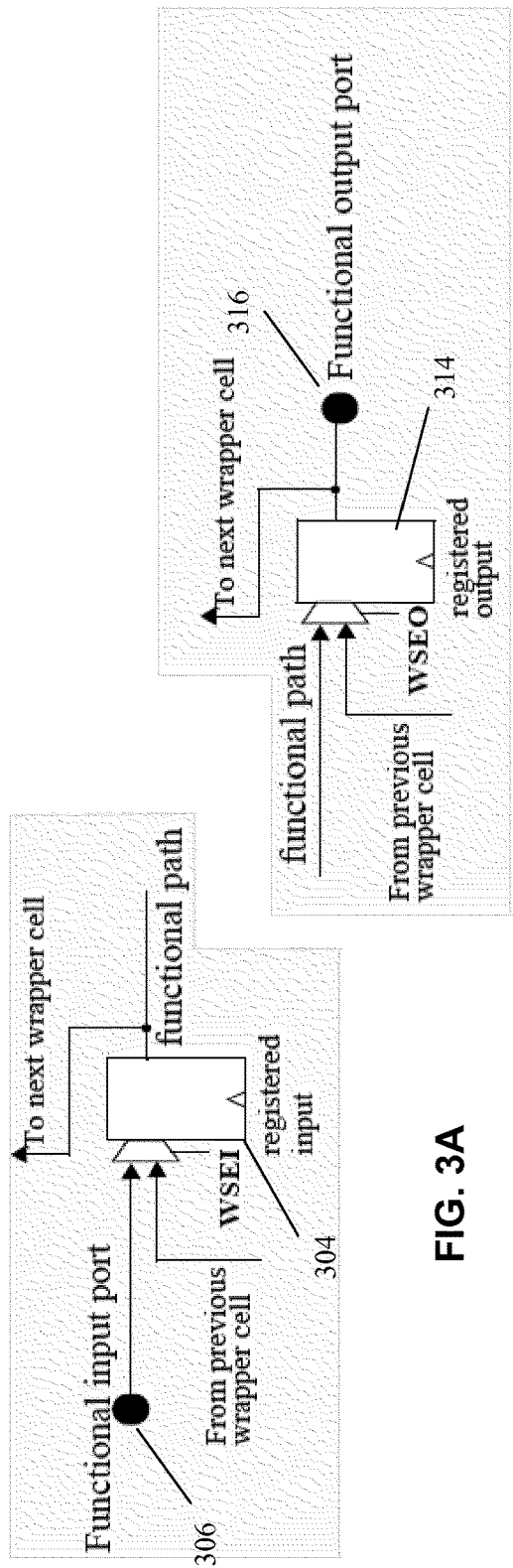

OPTIMIZING CORE WRAPPERS IN AN INTEGRATED CIRCUIT

TECHNICAL FIELD

The present embodiments relate generally to physically implementing integrated circuit designs, and more particularly for optimizing core wrappers for facilitating core-based SOC tests in an integrated circuit design.

BACKGROUND

During the design of an application specific integrated circuit (ASIC) or system-on-chip (SOC), design for test (DFT) and automatic test pattern generation (ATPG) methodologies are typically used to develop a test sequence that, when applied to the ASIC or SOC, can detect potential failures of the ASIC or SOC. After the ASIC or SOC has been manufactured, it can be placed into a scan mode, which forces all the flip-flops in the device to be connected in a simplified fashion, and these test sequences can be used to test all the flip-flops, as well as to trace failures to specific flip-flops.

Meanwhile, SOC design using reusable intellectual property (IP) cores has become a state-of-the-art implementation paradigm for IP core providers and system integrators. The IP cores are pre-designed and pre-verified by the core providers. Special test access mechanisms (TAMs) are required to facilitate core-based SOC test. To enable both core reuse and easy test access, the embedded cores are connected to the TAMs using special interfaces called core wrappers. However, wrapping a core using current DFT techniques may present area and timing issues that adversely affect an integrated circuit design.

SUMMARY

According to certain aspects, the present embodiments relate to optimizing core wrappers in an integrated circuit to facilitate core-based testing of the integrated circuit. In some embodiments, an integrated circuit design flow is adjusted so as to increase the use of shared wrapper cells in inserted core wrappers, and to reduce the use of dedicated wrapper cells in such core wrappers, thereby improving timing and other integrated circuit design features. In these and other embodiments, the increased use of shared wrapper cells is performed even in the presence of shift registers in the integrated circuit design.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIGS. 3A and 3B are diagrams illustrating example shared wrapper cells in accordance with IEEE 1500;

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As set forth above, to enable both IP core reuse and easy test access, embedded cores need to be connected to the TAMs using special interfaces called core wrappers. The present applicants recognize that the IEEE 1500 standard provides a standard for wrapping circuit cores within a system-on-chip in IEEE-1500-compliant logic for testing purposes. The wrapper (also referred to as the core test wrapper, core wrapper, or simply the test wrapper) provides serial and parallel test mechanisms (also referred to as TAMs) to the core contained within the wrapper. By operating in accordance with test instructions provided to the wrapper via a Wrapper Instruction Register (WIR), the test access mechanisms enable both parallel and serial access to the pins of the core within the wrapper and thereby allow for easier core accessibility for testing and reuse purposes.

Figure 1:
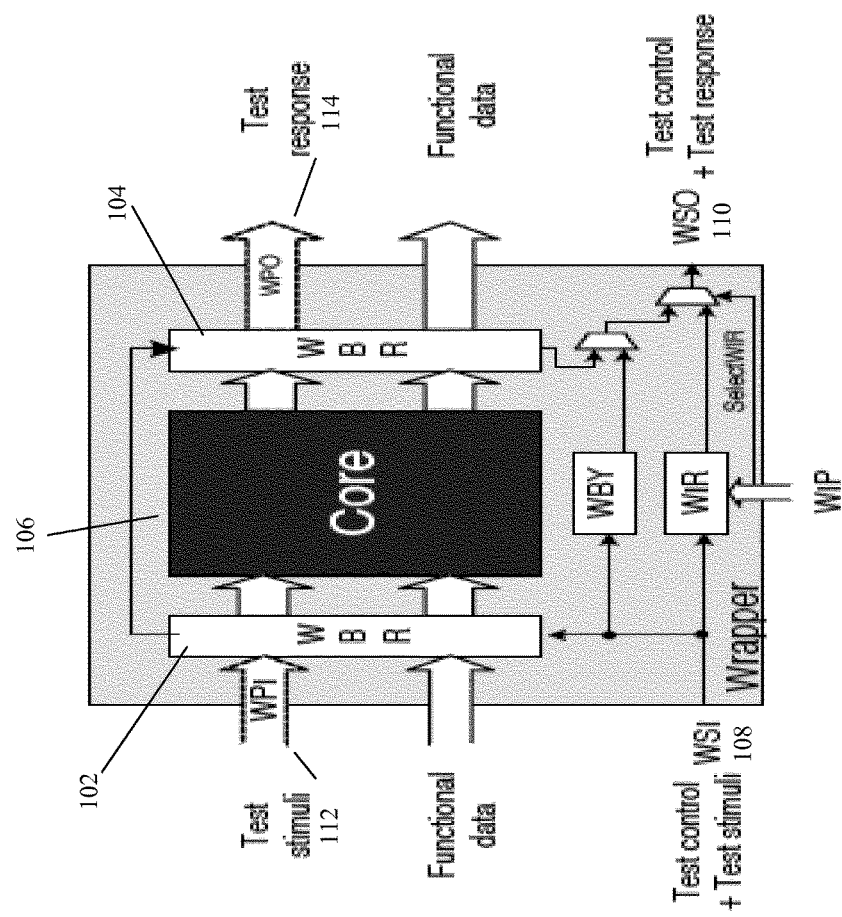
FIG. 1 is a block diagram illustrating an IEEE 1500 wrapper architecture.

An example architecture of a wrapper in accordance with IEEE 1500 is shown in FIG. 1. As shown, according to the IEEE 1500 standard, a Wrapper Boundary Cell (WBC) or simply Wrapper Cell (WC) is placed on each functional pin of a core 106, with the Wrapper Boundary Cells forming the Wrapper Boundary Registers (WBRs) 102, 104 that create an isolation boundary between core 106 and logic external to the core. Two forms of access are defined by the standard: (1) a Wrapper Serial Port (WSP) consisting of a single scan-in designated Wrapper Serial Input (WSI) 108 and a single scan-out port designated Wrapper Serial Output (WSO) 110, and (2) a Wrapper Parallel Port (WPP) consisting of multiple Wrapper Parallel Input (WPI) 112 and Wrapper Parallel Output (WPO) 114 terminals (e.g., pins).

The WCs in WBRs 102, 104 include multiplexers to switch between functional and test mode of operation. There are two kinds of WCs for an IEEE 1500 standard interface: dedicated WCs (DWCs) and shared WCs (SWCs).

Figures 2A, 2B:
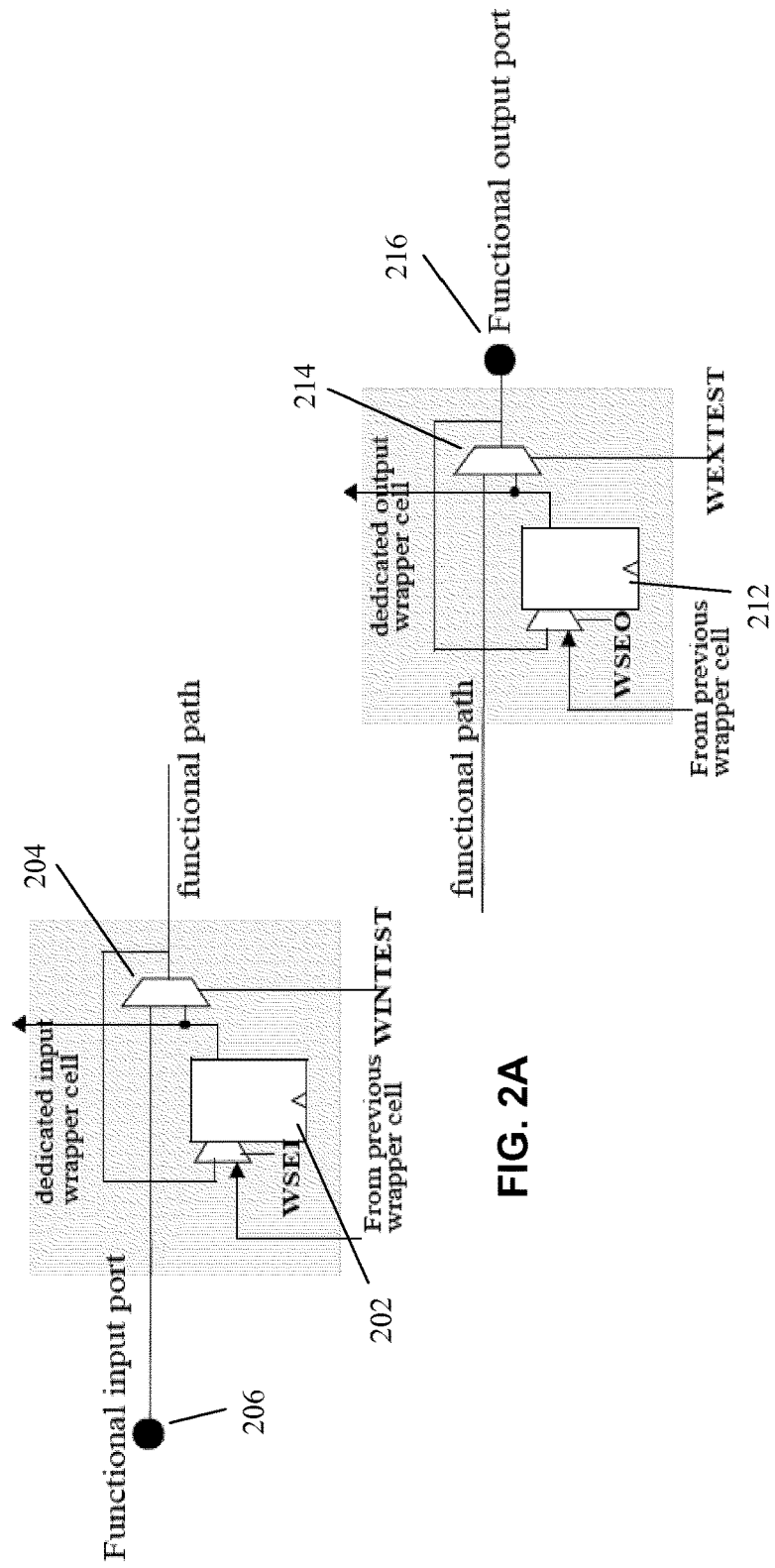
FIGS. 2A and 2B are diagrams illustrating example dedicated wrapper cells in accordance with IEEE 1500.

FIGS. 2A and 2B illustrate an example DWC. As shown in FIG. 2A, a DWC for a functional input port according to IEEE 1500 includes a register 202 for use in testing and a mux 204 to enable the functional input port 206 of the core for the test mode of operation. Likewise, as shown in FIG. 2B, a DWC for a functional output port according to IEEE 1500 includes a register 212 for use in testing and a mux 214 to enable the functional output port 216 of the core for the test mode of operation. When a DWC is inserted into a design for an input port, the flop 202 and mux 204 are also inserted into the design. Similarly, when a DWC is inserted for an output port, the flop 212 and mux 214 are also inserted into the design. This additional inserted logic adds area to the design, and also adds delay on the functional data path.

FIGS. 3A and 3B illustrate an example SWC. As shown in FIG. 3A, an input bounding SWC according to IEEE 1500 includes an existing register 304 that is re-used for testing. Likewise, as shown in FIG. 3B, an output bounding SWC according to IEEE 1500 includes an existing register 314 that is re-used for testing. A SWC thus re-uses the existing bounding registers 304, 314 for ports 306, 316, respectively, to implement the control and observe function needed for the wrapper cell. The existing register must be available to perform the IEEE 1500 wrapper function, as will be described in more detail below. Some advantages of SWCs are that fewer flip-flops get added to the design, there is no mux delay in the functional path and external test mode can test the timing of the actual path.

According to certain aspects of the present embodiments, the present applicants have further recognized that there can be various ways that wrapper cells (DWCs and/or SWCs) can be inserted into an integrated circuit design, and that the choice to include DWCs versus SWCs where wrappers are needed can have various impacts on the design.

Figure 4:
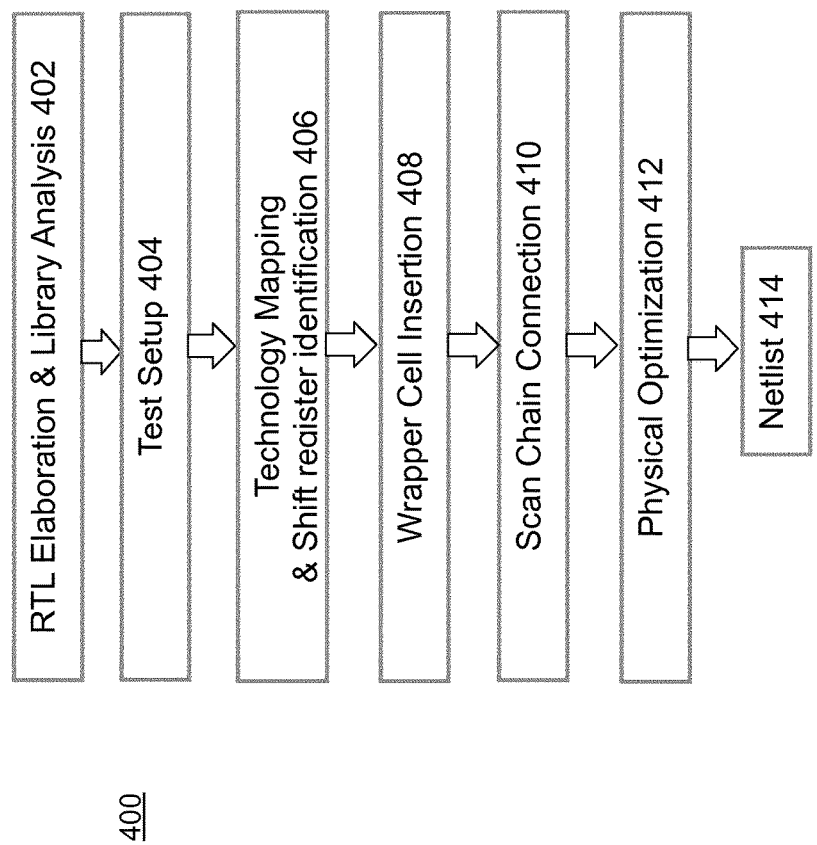
FIG. 4 is a diagram illustrating an example integrated circuit design implementation flow including DFT processing for inserting wrappers in an integrated circuit design.

FIG. 4 is a diagram of an example synthesis flow 400 including a DFT step in which IEEE 1500 wrapper cells are inserted into an integrated circuit (IC) design. In embodiments, a system incorporating a synthesis flow 400 can be implemented by one or more general purpose computers that are loaded with an operating system executing software and/or customized to include hardware for interactively implementing physical electronic designs (e.g. IC designs such as original design RTL stored in a GDS II data format) and adapted with the optimization functionality of the present disclosure. In some embodiments, the one or more computing systems comprise various components not shown such as the processor(s) or processor core(s), memory, disks, etc. The one or more computing systems may further write to and read from a local or remote volatile or non-volatile computer accessible storage not shown that stores thereon data or information such as, but not limited to, one or more databases such as schematic design database(s) or physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with electronic design automation (EDA) application software (e.g., a synthesis tool, DFT tool and/or a test tool) for implementing some or all of the methodology of flow 400, and one or more client computers can communicate with the server computer(s) via a network to perform some or all of the methodology of flow 400 for a particular design. Those skilled in the art will understand how to adapt such software and/or tools for implementing flow 400 after being taught by the present examples.

The original design RTL and library are provided to block 402 where RTL elaboration and library analysis is performed. In this step, the register-transfer level of the design is transformed into the internal representation of the logic synthesis tool using a data flow graph to show how the design processes and transports data between functional units and a control flow graph that depicts the timing and synchronization of the data flow. The technology library that contains the building blocks of the logic cells (AND, OR, XOR etc) and specifications of timing of signal transitions from input to output pins, power consumed, area and other electrical characteristics are analyzed. In block 404, the active values for putting the design in test mode are provided. This block also includes running a DFT rule checker to determine the set of flops that may be used for scan mapping. The rule checker verifies whether the clock and async set/reset pins of a flop are controllable from an input port. If these are controllable, then the flop is considered to pass the rule check. In block 406, the logic gates are mapped into technology cells, which is called technology mapping. The selection of appropriate technology cells is made on the basis of multiple cost functions like required arrival time, area and power. To make the appropriate decisions these instances are placed on various locations on the die as per connectivity and timing needs.

As part of technology mapping, all of the shift registers in the design, and all the flops belonging to them, are identified. Two flops in the design are considered to be a part of a shift register if they shift data between them. Depending on the attribute value associated with the flop, different shift registers can be identified. The technology mapping process also maps the flops that pass DFT rule checks, to scan flops. For a shift register, the first flop is mapped to a scan flop. Second and subsequent flops of a shift register are mapped to normal non-scan flops.

After technology mapping and shift register identification is performed, block 408 includes processing for performing wrapper cell insertion. In this block, the IP core(s) in the design are identified, and IEEE 1500 wrapper cells are inserted on the functional input and output ports of these core(s). This block 408 also includes a decision of whether to insert a DWC or a SWC on functional ports.

Figure 5:
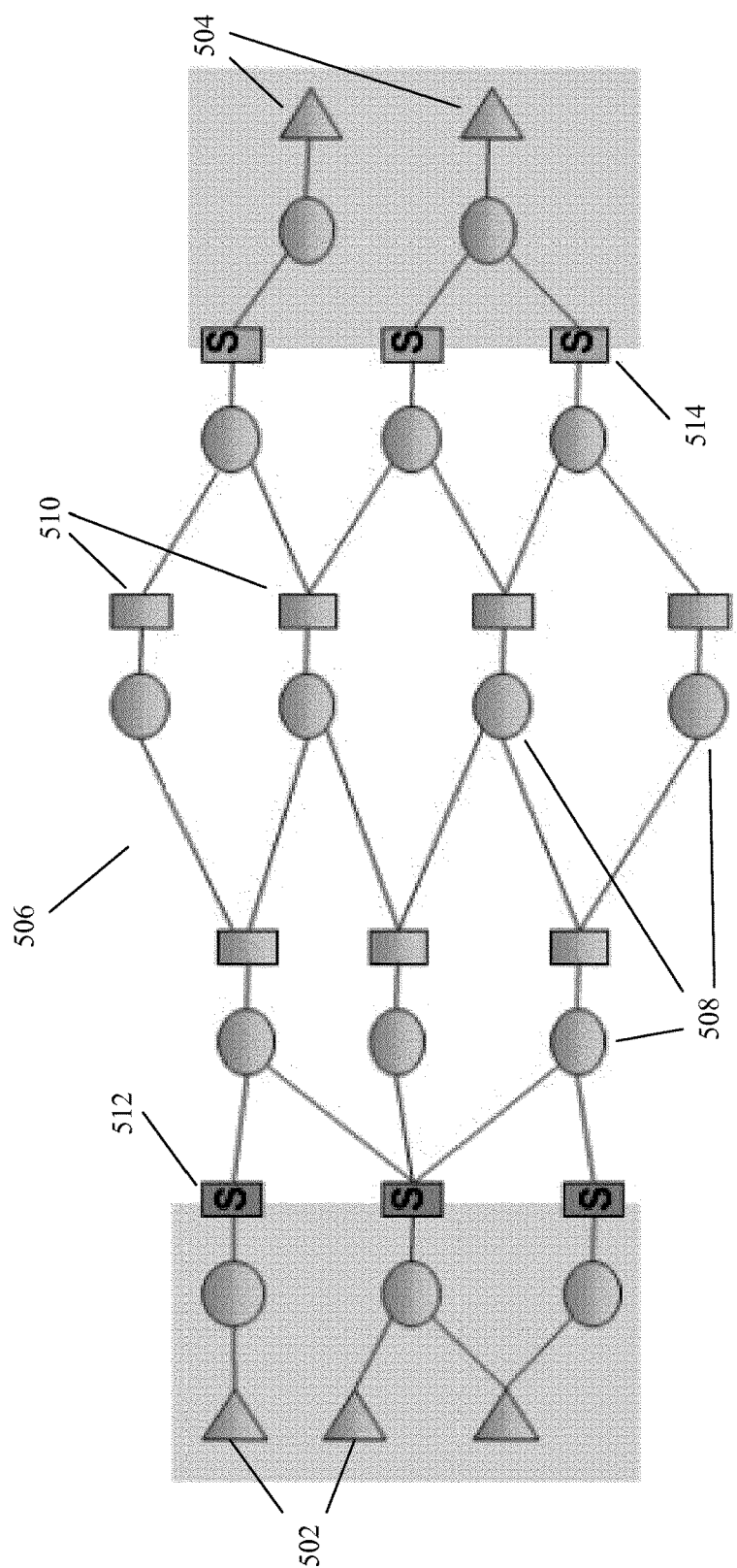
FIG. 5 is a diagram illustrating a portion of an integrated circuit that is analyzed in an example process for inserting wrappers in an integrated circuit design.

FIG. 5 is a block diagram of a portion of an integrated circuit design for illustrating an example process of determining whether to insert a DWC or a SWC on functional ports in block 408. As shown in this example, an integrated circuit design includes a core (not shown) having functional input ports 502 and functional output ports 504. As further shown in this example, the integrated circuit design has been technology mapped (for example, in block 406). The flops which have passed DFT rule check in 404 are mapped to scan flops to be included in scan chains. These flops produce a fan-in/fan-out cone 506 of interconnected combinatorial logic 508 and flops 510. It should be noted that this diagram is greatly simplified for illustrating aspects of the present embodiments, and that a typical fan-in/fan-out cone for a given functional port of an integrated circuit design can be substantially more complex.

In block 408, each functional port 502, 504 is checked for certain conditions to determine whether a SWC 512, 514 can be inserted, or whether a DWC must be inserted instead. In an example process for checking ports 502, the conditions include that there should be at least one flop in the fan-in portion of cone 506 and the logic in the fan-out portion of cone 506 should be completely defined (i.e. there cannot be any black boxes or abstract cells). Moreover, for a flop in the fan-in portion of cone 506 of a port 502 to be used in a SWC segment covering the port, it must satisfy the following constraints, among others: it should be a scan mapped flop, it should pass the DFT rule checker in 404; it should have a unique functional connection (i.e., only either Q or QB should be functionally connected); it cannot be part of any other scan chains; it cannot be part of any other scan segment; it cannot be preserved (i.e., it should be modifiable as needed to make it a shared wrapper cell). If no flop satisfying these requirements is found in the fan-in portion of cone 506 for a given port 502, a DWC must be inserted instead of a SWC for that port.

Moreover, as shown in the example flow 400, shift registers would already be identified when wrapper insertion takes place in block 408. So while identifying flops for possible use with a SWC 512, 514 for a port 502, 504, block 408 may further determine whether the flop is already part of a shift register. In the example flow 400, a flop that is part of a shift register is rejected for use in a SWC, and a DWC for that port is inserted instead.

Returning to the example flow 400 shown in FIG. 4, in block 410, the design undergoes physical aware scan-chain connection to get the final netlist 414. Physical aware scan-chain optimization 412 can include scan-chain reorder which re-arranges the scan-chain flip-flops according to their physical proximity to each other while maintaining the existing scan-chain connectivity and integrity before the netlist 414 is finalized.

While the insertion of wrapper cells as performed in flow 400 guarantees high test quality for each core, the design for test (DFT) area overhead of the wrappers may adversely influence the cost of the test. Wrapper cell multiplexers placed on critical I/O bounding timing paths may also lower the maximum operating frequency thus having a direct impact on the SOC's functional timing performance. In this regard, SWC's are better in both areas as compared to DWCs. However, in a flow such as flow 400 as shown above, re-using an already existing flop as a SWC requires the flop to not be a part of a pre-existing scan-segment, nor can it be part of a shift register.

Meanwhile, there is an increasing trend in large integrated circuit designs, and especially in networking and switch designs, for including large numbers of functional shift registers. For some designs, more than 60% of the design's flip-flops may be functional shift registers (SRs). In such designs, in a flow such as flow 400, many more DWCs are inserted than would otherwise be necessary. This results in greater timing problems and can lead to area overhead too.

In accordance with certain aspects, therefore, the present embodiments are directed to optimizing core wrappers by reducing the number of DWCs and increasing the number of SWCs that are inserted in an integrated circuit design even in the presence of shift register segments in the design. It should be noted, however, that the term "optimizing" should not be construed to narrowly cover the most ideal solution, but should be construed more broadly to include solutions that merely improve aspects of an IC design.

Figure 6:
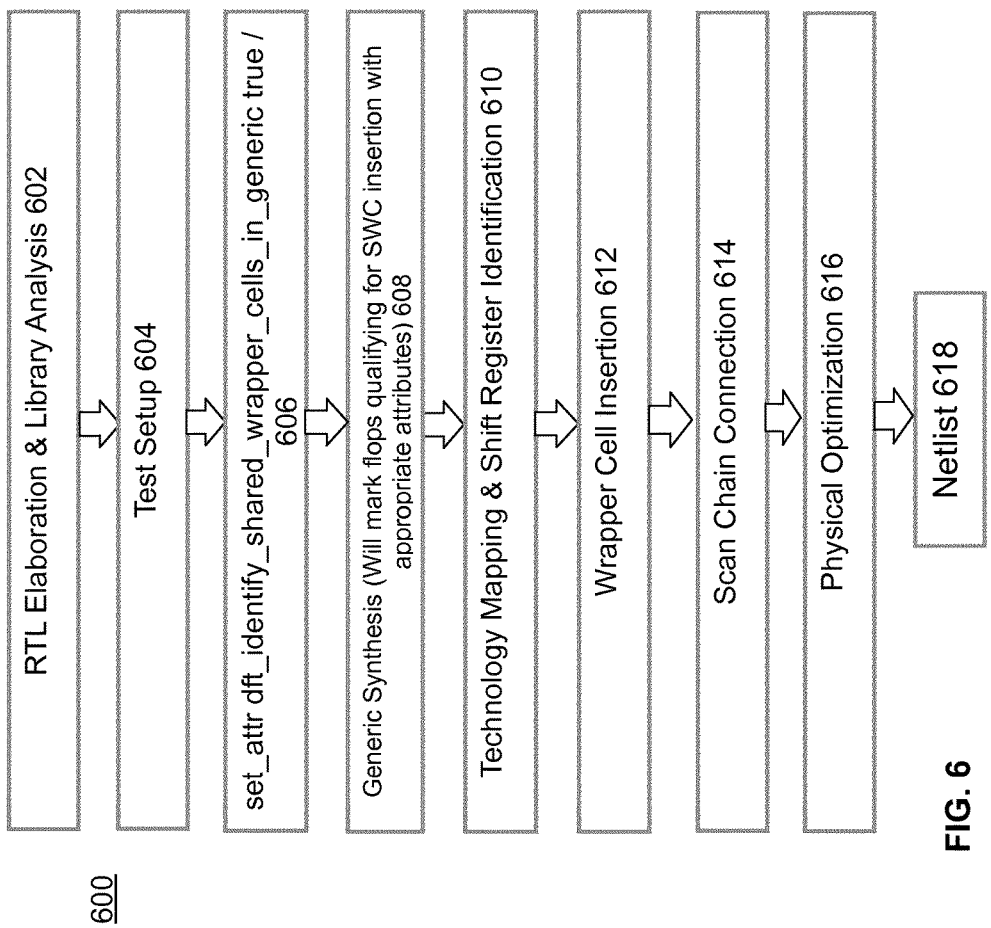
FIG. 6 is a diagram illustrating an example integrated circuit design implementation flow including DFT processing for inserting optimized wrappers in an integrated circuit design according to the present embodiments.

FIG. 6 is an example flow 600 according to embodiments. In this example approach, the flow 400 is changed such that wrapper cells can be either identified or inserted in a generic netlist prior to shift register identification. If the shared wrapper flops are already identified, then the shift register identification routine can easily exclude such flops from shift register segments. However, this strategy requires a change in flow as shared wrapper cells can't be identified in a generic netlist.

More particularly, flow 600 can be implemented by a system such as that described above in connection with flow 400, including a DFT tool or test tool as adapted with the present methodology. Moreover, in flow 600, blocks 602, 604, 610, 612, 614 and 616 can be implemented similarly to blocks 402, 404, 406, 408, 410 and 412, respectively.

Differently from flow 400, however, flow 600 includes blocks 606 and 608 following block 604. In block 606, an attribute is set for causing the tool to identify shared wrapper cells in a generic design. More particularly, this attribute acts as a flag to notify the tool that SWCs should be identified in the generic design. If this flag is not set, then no SWCs are identified in 608.

Block 608 includes a technique of identifying and marking the flops fit to be used as shared wrapper cells in a generic design. This can be done prior to shift register identification. Accordingly, when shift registers are identified in block 610, the tool already knows about the flops that are marked for shared wrapper cells and can exclude those from shift register definition.

Figure 7:
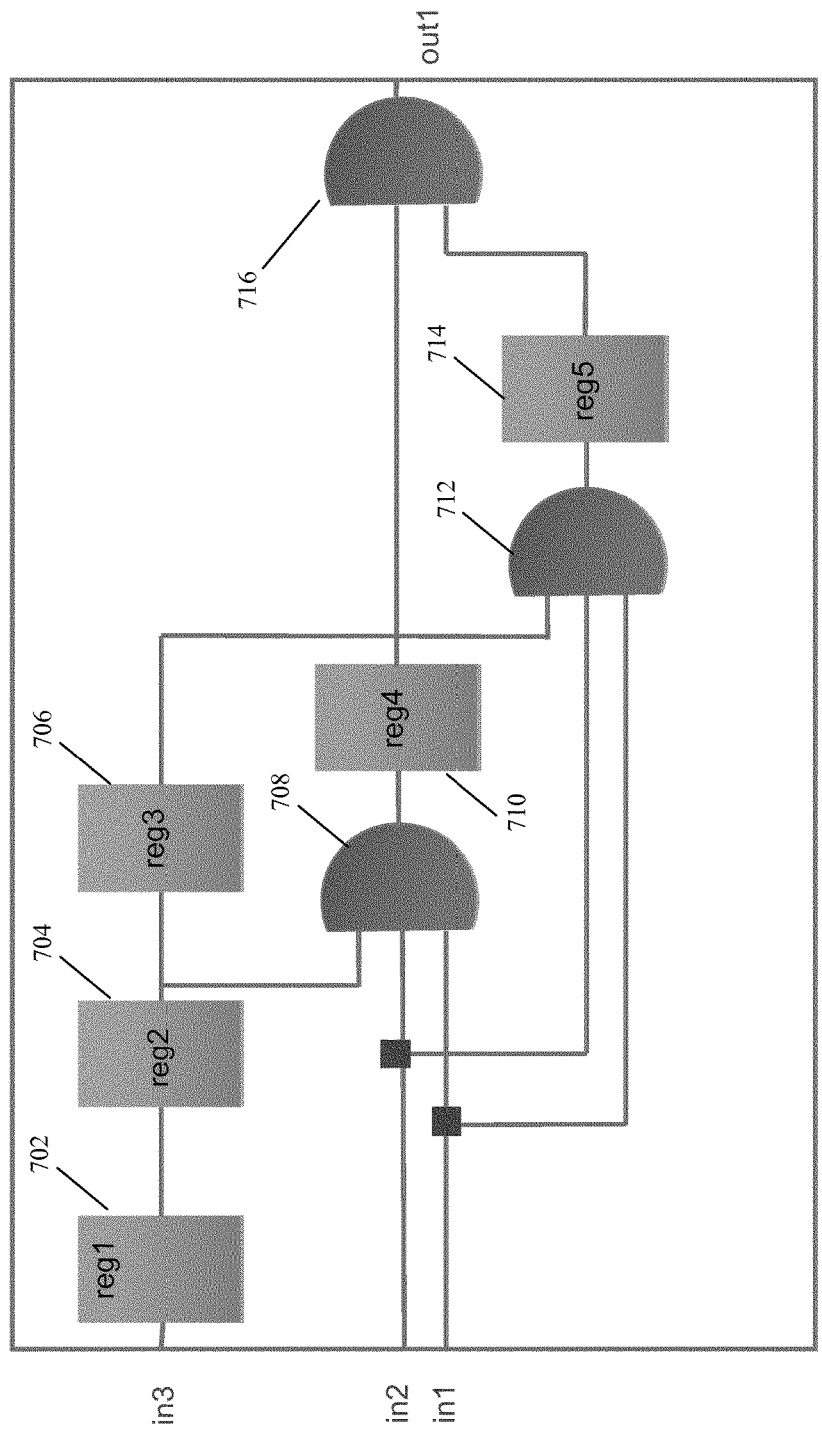
FIG. 7 is a diagram further illustrating processing performed in the example flow of FIG. 6.

An example of the processing of block 608 is shown in FIG. 7. As shown in FIG. 7, the functional input port in3 has flop 702 in its fan-out cone. So, flop 702 is identified as an input bounding SWC for in3. Similarly, both flops 710 and 714 are in the fan-out cone of ports in2 and in1. So, both flops 710 and 714 are considered as input bounding SWCs for functional input ports in2 and in1. Flop 704 feeds the combinational logic 708 which in turn feeds flop 710. Since flop 710 is a SWC for functional input ports in2 and in1, flop 704 is considered as an internal flop and is marked as an output bounding SWC for functional inputs in2 and in1. Similarly, register 706 feeds the combinational logic 712 which in turn feeds flop 714. Since flop 714 is a SWC for functional input ports in2 and in1, flop 706 is marked as an output bounding SWC for functional inputs in2 and in1. For functional output port out1, its fan in includes flop 714. Since flop 714 is already marked as input bounding SWC for functional input ports in2 and in1, flop 714 is reused by functional output port out1 as an input bounding SWC.

Figure 8:
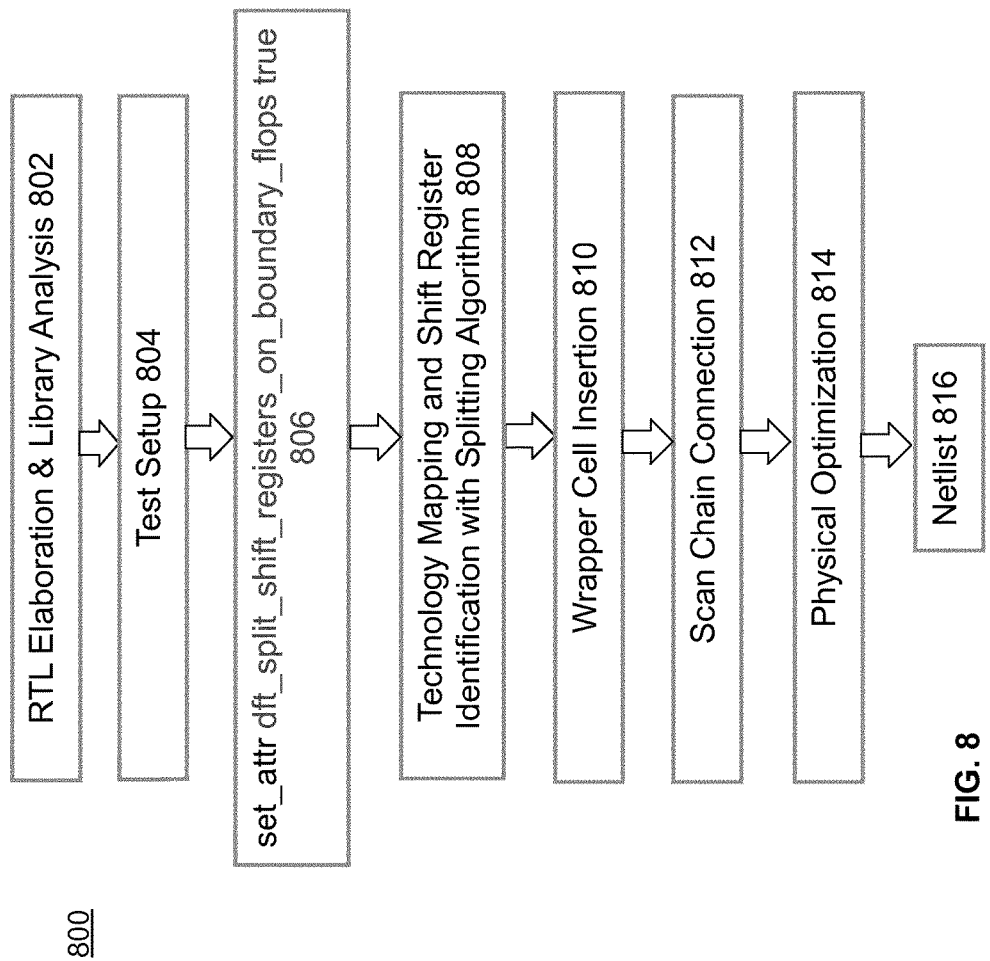
FIG. 8 is a diagram illustrating another example integrated circuit design implementation flow including DFT processing for inserting optimized wrappers in an integrated circuit design according to the present embodiments.

FIG. 8 is another example flow 800 according to embodiments. In this approach, if it's found that a flop which is in the fan-out cone of a port is otherwise fit to be selected as a shared wrapper flop but can't be made so as it's part of a shift register segment, the shift register may be split into two smaller shift register segments. This may be done in such a way that the flop no longer remains as part of any shift register segment. Once the DFT data structures are modified in that way, the flop can then be converted to a shared wrapper flop.

More particularly, flow 800 can be implemented by a system such as that described above in connection with flow 400, including a DFT tool or test tool as adapted with the present methodology. Moreover, in flow 800, blocks 802, 804, 810, 812 and 814 can be implemented similarly to blocks 402, 404, 408, 410 and 412, respectively.

Differently from flow 400, however, flow 800 includes block 806 following block 804 and a new block 808 in place of block 406 of flow 400. In block 806, an attribute is set for causing the tool to split shift registers in the design. More particularly, this attribute acts as a flag and if set, it causes the shift register to be split into smaller parts if any flops in the shift register is marked as a shared wrapper flop.

In block 808, subsequent to technology mapping and shift register identification processing described above in connection with block 406, processing is performed to identify the boundary flops in the fan-in/fan-out cone of functional input and output ports. Based on that identification, shift registers are split into two or more smaller shift registers such that the flop in the fan-in/fan-out cone of the port is no longer part of any shift register. In this way, the flop may be used as a shared wrapper segment in block 810.

Figure 9B:
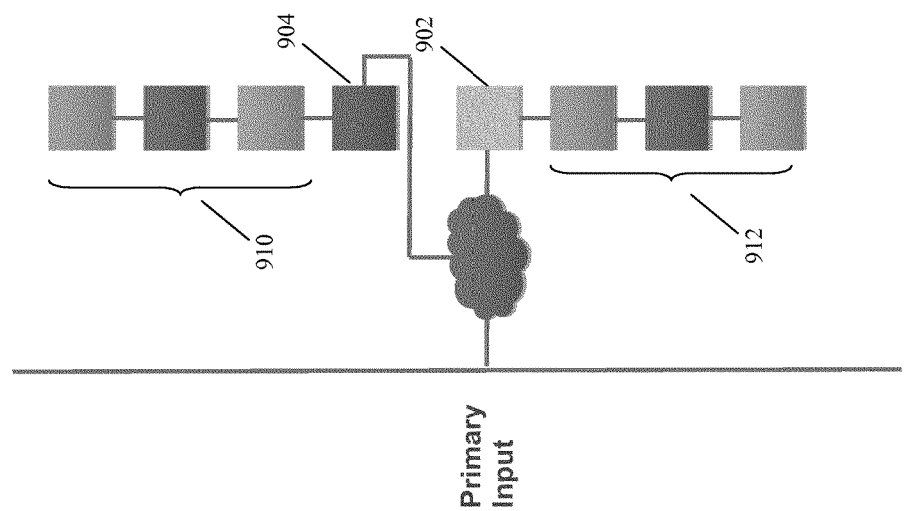
FIGS. 9A and 9B are diagrams further illustrating processing performed in the example flow of FIG. 8.
Figure 9A:
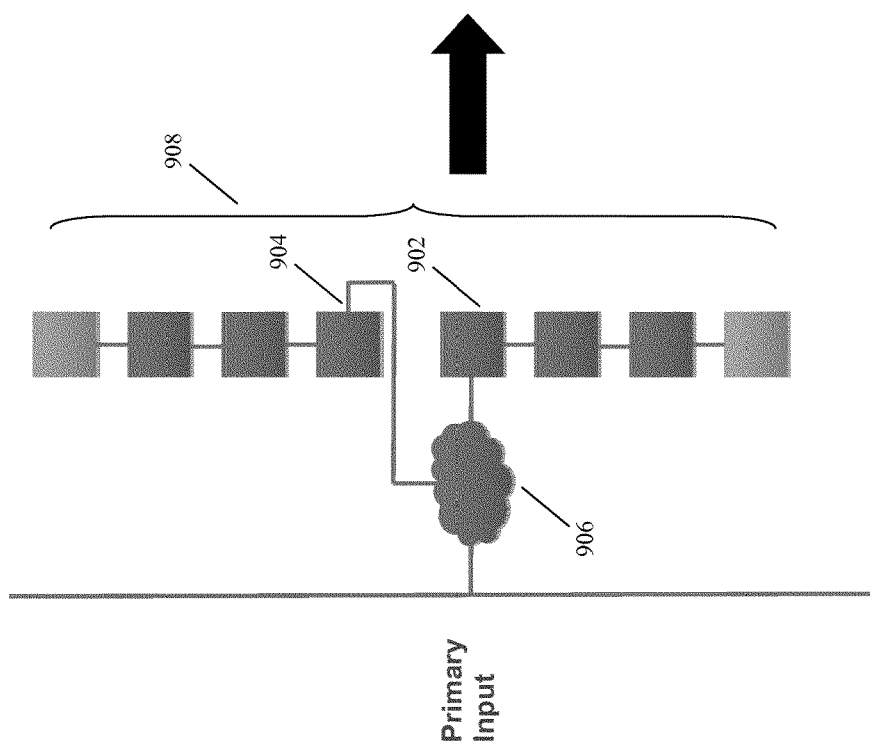

An example of this processing is shown in FIGS. 9A and 9B, in which one longer shift register is split into two smaller shift registers. In FIG. 9A, the flop 902 is in the fan-out cone of the port 'PI' and can otherwise be used as an input bounding shared wrapper segment. The flop 904 feeds the combinational logic 906 that in turn feeds the flop 902. So the flop 904 can be used as an output bounding shared wrapper cell. However, they are both part of a shift register 908. Accordingly, as shown in FIG. 9B, the shift register 908 is split into two shift registers 910 and 912, and flops 902 and 904 are separated out from the shift registers 910 and 912. In an actual design, the flops which are predecessor and successors of 904 and 902 in the shift path of the shift registers are stored and used for splitting the shift register. These predecessor and successor flops are then used to create smaller shift registers 910 and 912. As such, in block 810 these flops 902 and 904 can now be used in SWCs, thereby reducing the number of DWCs in the design.

The present applicants have performed studies of the approaches of the present embodiments, and the results can be summarized as follows. On three different networking designs, there was a 98.8% to 99.9% reduction in the number of DWCs inserted. There was also a WNS reduction of 6-99% and a TNS reduction of 25-74%. Additional benefits, although small, are the area benefits of 1-3% on these designs.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of adding a core wrapper to a design of an integrated circuit, comprising:
    identifying a flop in a fan-in/fan-out cone of a functional port of a core in the integrated circuit design, wherein the flop is part of a shift register in the integrated circuit design; and causing the flop to be included in a shared wrapper cell (SWC) of the core wrapper for the core, wherein causing the flop to be included in the SWC includes splitting the shift register into two smaller shift registers with the flop connected between the two smaller shift registers.

2. The method of claim 1, wherein causing the flop to be included in the SWC includes allowing the flop to be identified for use in the SWC before the flop is identified as being part of the shift register.

3. The method of claim 1, wherein causing the flop to be included in the SWC eliminates a requirement to add a new flop into the design associated with a dedicated wrapper cell (DWC) of the core wrapper.

4. The method of claim 1, further comprising adapting an integrated circuit design process flow to include causing the flop to be included in the SWC.

5. The method of claim 4, wherein the integrated circuit design process flow includes a process for identifying shift registers in the integrated circuit design, and wherein adapting includes identifying the flop in the fan-in/fan-out cone and causing the flop to be included in the SWC before the process for identifying shift registers.

6. The method of claim 4, wherein the integrated circuit design process flow includes a process for identifying shift registers in the integrated circuit design, and wherein adapting includes modifying the process for identifying shift registers to allow for the flop to be removed from the shift register.

7. The method of claim 4, wherein the integrated circuit design process flow further includes a process for adding the core wrapper to the integrated circuit design, wherein the flop is included in the SWC for the core wrapper during the process for adding the core wrapper to the integrated circuit design.

8. The method of claim 1, wherein the core wrapper is compliant with IEEE 1500.

9. A computer program product comprising a non-transitory computer readable storage medium having instructions stored thereon which, when executed by a computer, cause the computer to perform a method of adding a core wrapper to a design of an integrated circuit, the method comprising:
    identifying a flop in a fan-in/fan-out cone of a functional port of a core in the integrated circuit design, wherein the flop is part of a shift register in the integrated circuit design; and
    causing the flop to be included in a shared wrapper cell (SWC) of the core wrapper for the core, wherein causing the flop to be included in the SWC includes splitting the shift register into two smaller shift registers with the flop connected between the two smaller shift registers.

10. The computer program product of claim 9, wherein causing includes the flop to be included in the SWC includes allowing the flop to be identified for use in the SWC before the flop is identified as being part of the shift register.

11. The computer program product of claim 9, wherein causing the flop to be included in the SWC eliminates a requirement to add a new flop into the design associated with a dedicated wrapper cell (DWC) of the core wrapper.

12. The computer program product of claim 9, wherein the instructions further include instructions for causing the computer to perform an integrated circuit design process flow, and wherein the integrated circuit design process flow has been adapted to include causing the flop to be included in the SWC.

13. The computer program product of claim 12, wherein the integrated circuit design process flow includes a process for identifying shift registers in the integrated circuit design, and wherein adapting includes identifying the flop in the fan-in/fan-out cone and causing the flop to be included in the SWC before the process for identifying shift registers.

14. The computer program product of claim 12, wherein the integrated circuit design process flow includes a process for identifying shift registers in the integrated circuit design, and wherein adapting includes modifying the process for identifying shift registers to allow for the flop to be removed from the shift register.

15. The computer program product of claim 12, wherein the integrated circuit design process flow further includes a process for adding the core wrapper to the integrated circuit design, wherein the flop is included in the SWC for the core wrapper during the process for adding the core wrapper to the integrated circuit design.

16. The computer program product of claim 9, wherein the core wrapper is compliant with IEEE 1500.

* * * * *